Jan. 9, 1968 R. H. HURST 3,362,114
UNIVERSAL DRIVING SPINDLE AND WHEEL ASSEMBLY
Filed Nov. 4, 1964 2 Sheets-Sheet 1

INVENTOR.
ROBERT H. HURST
BY
*H.S. Brownell*
ATTORNEY

Jan. 9, 1968  R. H. HURST  3,362,114

UNIVERSAL DRIVING SPINDLE AND WHEEL ASSEMBLY

Filed Nov. 4, 1964  2 Sheets-Sheet 2

INVENTOR.
ROBERT H. HURST
BY
K.W. Brownell
ATTORNEY

United States Patent Office 3,362,114
Patented Jan. 9, 1968

3,362,114
UNIVERSAL DRIVING SPINDLE AND WHEEL ASSEMBLY
Robert H. Hurst, Barrington, R.I., assignor to Rexall Drug and Chemical Company, Los Angeles, Calif., a corporation of Delaware
Filed Nov. 4, 1964, Ser. No. 408,789
11 Claims. (Cl. 51—376)

ABSTRACT OF THE DISCLOSURE

A mounting assembly for an abrasive wheel comprising a driving spindle with a deformable shank and a head portion having lugs extending therefrom embedded in one side of said wheel. A washer is located on said shank engaging the other side of the wheel. The shank is expanded over the washer to lock the wheel between the head portion of the spindle and the washer.

---

This invention relates to improvements in universal driving spindle and wheel assemblies, and more particularly to a new and improved mounting for driving surface treating wheels, and to a new and improved method for assembling such mounting and wheels, e.g. a coated or bonded abrasive rotating element.

A primary object of the invention is to provide a mounting including a driving spindle having a deformable shank portion for rapid, efficient and inexpensive assembly with such wheel.

Another object is to provide a driving spindle having lug means adapted to be embedded in such element for exerting a positive driving force thereon.

A further object is to provide a spindle having a shank portion of non-circular cross section and adapted to fit through a non-circular opening in such element for exerting a positive driving force thereon.

Another primary object is to provide a mounting including a specially designed washer for operative association with the spindle and adapted to be locked in place on the shank portion upon deformation thereof.

A further primary object is to provide a method of rapidly, efficiently and inexpensively assembling such mounting and element by expanding the shank portion of the spindle to lock the washer in place thereon and thereby create a very strong mechanical holding and driving force on the wheel, disc or rotated member.

Additional objects and advantages of the invention will become apparent upon consideration of the following detailed description and accompanying drawings wherein.

Figure 1:
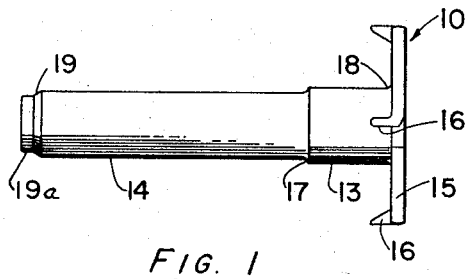
FIGURE 1 is an enlarged side elevational view of a spindle embodying part of the inventive mounting.

Referring to the drawings, and particularly FIGURES 1–5, a preferred embodiment of the inventive mounting is composed of a driving spindle generally indicated at 10 and a holding washer generally indicated at 11, while a typical abrasive disc or wheel adapted for assembly with spindle 10 and washer 11 is generally indicated at 12.

*Spindle*

Figure 2:
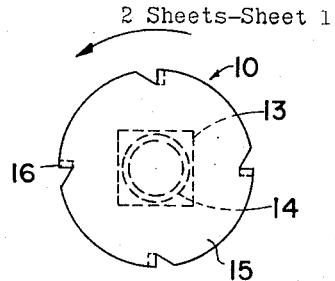
FIGURE 2 is an enlarged front elevational view of the spindle of FIGURE 1.

Referring specifically to FIGURES 1 and 2, spindle 10 is made of suitable metallic material and is composed of a deformable shank portion 13 of uniform non-circular, preferably polygonal, and especailly, square cross section, a reduced shaft portion 14 of uniform, preferably circular cross section at one end of shank portion 13, and an enlarged disc-shaped head portion 15 of uniform preferably circular cross section at the other end of shank portion 13. Preferably four equally spaced peripheral pointed lug or prong portions 16 project axially from the side of head portion 15 facing shank portion 13.

The spindle 10 is made from suitable metal such as cold rolled steel and is designed with stress relieving radii 17 and 18 at the junctures of the shaft and shank portions and of the shank and head portions respectively. The shaft portion 14 is cut to length and provided with a taper or chamfer 19 adjacent its reduced rear or free end portion 19a, and the lug portions 16 are struck out from head portion 15, being bent away from the direction of spindle and wheel rotation (as indicated by the arrow in FIGURE 2) for maintaining their embedded position during use.

At this point it is to be noted that while reduced shaft portion 14 is shown as having a diameter slightly smaller than a side of shank portion 13, the term "reduced," as applied herein to the shaft portion, is intended to include a diameter equal to a side of the shank portion, and wherein the preferably circular shaft portion is inscribed within the preferably square or irregularly shaped shank portion. However, it is preferred that the diameter of shaft portion 14 be slightly smaller than a side of shank portion 13 to facilitate the shank staking operation to be described below.

*Washer*

Figure 3:
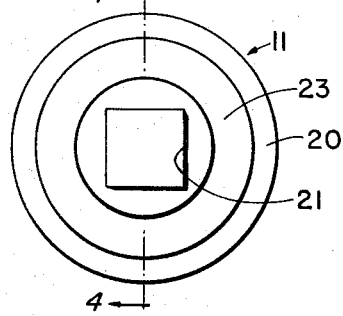
FIGURE 3 is an enlarged front elevational view of a washer adapted for use with the spindle of FIGURE 1.
Figure 4:
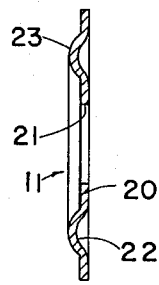
FIGURE 4 is a sectional view taken on line 4—4 of FIGURE 3.

Referring now to FIGURES 3 and 4, the holding washer 11 is formed of suitable metallic material, preferably steel, and is composed of an enlarged, disc-shaped body 20 of preferably circular cross section, the diameter of body 20 being larger than the diameter of head portion 15. Body 20 is provided with a central through opening 21 which is of the same preferably square or irregular shaped cross section as shank portion 13 to prevent relative rotation therebetween but which is slightly larger than the shank portion, in order to facilitate assembly. Body 20 is also provided with an endless annular recess 22 in one side forming a complementary arcuate boss 23 on its opposite side. Both recess 22 and boss 23 are arranged between opening 21 and the outer periphery of body 20 to provide clearance for lugs 16 and to strengthen washer 11 respectively, as will be described in greater detail below. In forming washer 11, body 20 and opening 21 are stamped out and recess 22 and boss 23 are die formed in the usual manner.

*Wheel*

Figure 5:
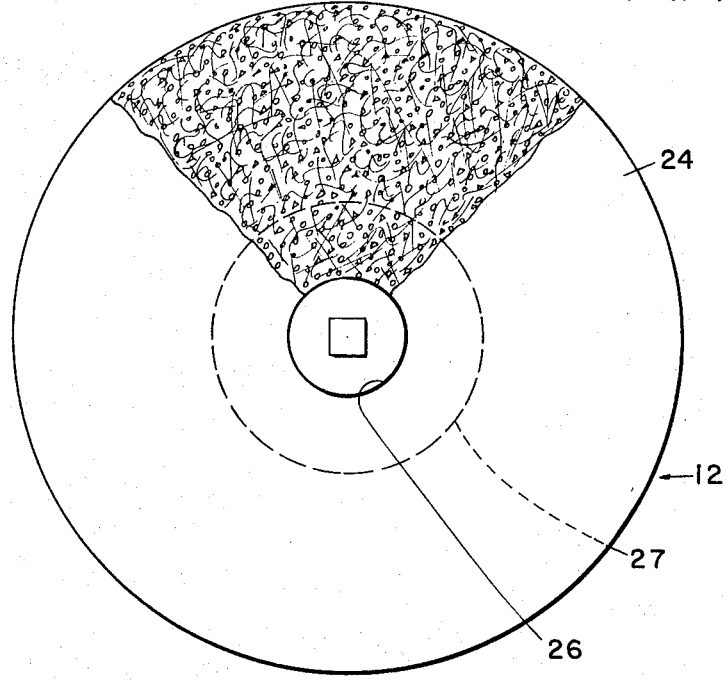
FIGURE 5 is a front elevational view of a typical abrasive wheel or disc prior to assembly with the inventive mounting.
Figure 6:
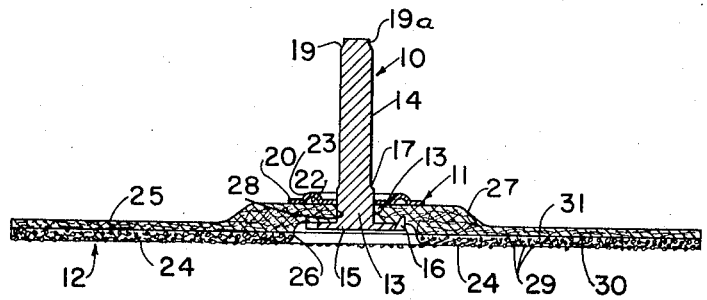
FIGURE 6 is a sectional view of the wheel or disc of FIGURE 4, but illustarting the spindle and washer in place prior to deformation of the spindle.
Figure 7:
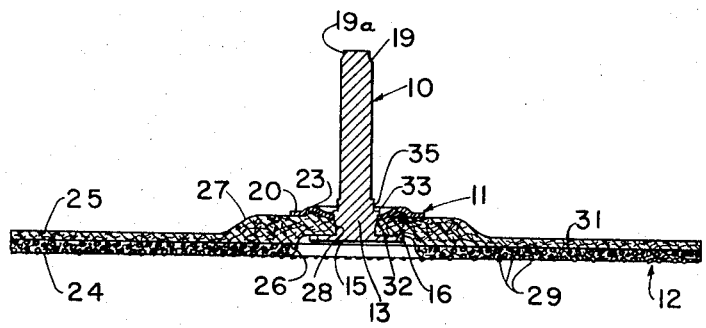
FIGURE 7 is a view similar to FIGURE 6, but illustrating the completed wheel assembly following deformation of the spindle.

Turning to FIGURES 5–7, a typical surface treating wheel 12 of the abrasive type is shown as being preferably composed of a circular abrasive disc 24 and a circular non-abrasive backing or carrying pad 25 of the same diameter. As will be evident the wheel 12 may be abrasive or non-abrasive in character, and its construction may vary widely, the particular construction shown being illustrative only.

Continuing with the illustrated construction, abrasive disc 24 is provided with a central preferably circular depressed area or recess 26 to receive spindle head portion 15 and thereby allow clearance so that when the assembly is driven, the head portion will not strike the surface being treated. Pad 25 is provided with a larger, central and preferably circular, raised hub portion 27 giving finger clearance so that the user can tighten up a chuck wrench, such as when shaft portion 14 is to be secured in a chuck of an electric drill, for example. Extending through abrasive disc 24 and pad 25 is a central through opening 28 which is of the same preferably square or irregular shaped cross section as shank portion 13 to prevent relative rotation therebetween, but which is slightly larger to facilitate insertion of the shank portion.

While the detailed structure of both disc 24 and pad 25 may be varied as desired, the abrasive disc is shown as being composed of many abrasive grains 29 embedded in a non-woven fibrous matrix 30 impregnated with a resinous or other suitable binder, and the non-abrasive back-up pad 25 is shown as being composed of a glass fiber reinforced, non-woven fabric 31 likewise impregnated with resin or other suitable binder. In fabricating wheel 12, the disc 24 and pad 25 are formed in any suitable manner with recess 26 and hub 27 respectively; they are superposed, and molded under heat and pressure to form an integral structure which is provided with central through opening 28.

*Assembly*

Figure 8:
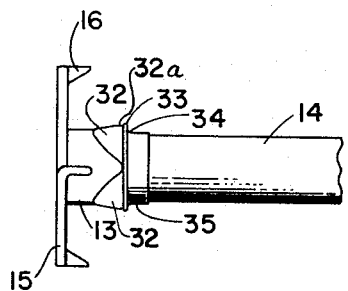
FIGURE 8 is an enlarged side elevational view of the spindle of FIGURES 1 and 6 following deformation of the shank portion.
Figure 9:
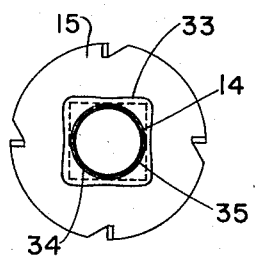
FIGURE 9 is a rear plan view of the spindle of FIGURE 8.

Continuing with FIGURES 6–9, the assembly of the mounting and wheel is preferably accomplished as follows. As shown in FIGURE 6, the shaft portion 14 and shank portion 13 of spindle 10 are inserted through central wheel opening 28 and lug portions 16 are embedded through abrasive disc 24 and into pad 25 until head portion 15 engages disc 24 in recess 26, and washer 11 is positioned over shank portion 13 until it engages hub portion 27, and is spaced from the outer end of the shank portion, with recess 22 facing and aligned with lug portions 16. Next, as best seen in FIGURES 7–9, the deformable shank portion 13 is expanded at its outer end to form outwardly flaring triangular wedge portions 32 including flattened portions 32a and terminating in an enlarged flange portion 33, as best seen in FIGURE 8. This cold forming operation may be performed by a suitable hollow staking die (not shown) acting on the rear or outer end face of shank portion 13, with head 15 being suitably supported, and the slightly smaller diameter of the reduced shaft portion 14 facilitates engagement between the die and the rear or outer face of the outer end of shank portion 13 to form flange portion 33 as a continuous essentially square or irregular shaped enlargement, as shown in FIGURE 9. In addition, the staking die reforms radius 17 to radius 34, as there is some slight clearance between the die and shaft portion 14 during the staking operation, leaving excess material as indicated by the numeral 35 in FIGURES 7 and 8. The excess material provides a positive lock over the back-up washer.

Referring to FIGURE 7 in particular, the immediate results of the cold forming operation are as follows. The enlarged, essentailly square or irregular shaped flange portion 33 firmly engages the outer or rear side of washer body 20 around opening 21, bending this portion of the body slightly inwardly and embedding the same in hub portion 27, and the flattened terminal portions 32a of wedge portions 32 firmly engage the inner periphery of washer body 11, all serving to lock washer 11 in place on deformed shank portion 13. At the same time, the wedge portions 32 deform the rear end of opening 28 in hub 27 to create a very strong mechanical holding and driving force in this area of wheel 12, while lug portions 16 are even further embedded into the wheel to enhance the holding and driving force in this area. Morever, the recess 22 in washer 11 not only provides suitable clearance for lug portions 16, but also receives a portion of hub 27 to solidify the assembly, while boss 23 strengthens washer 11 against undesirable bending during disc and spindle assembly.

While any size of surface treating wheel may be so assembled with the inventive mounting, the following example will serve to highlight the invention. For an abrasive wheel 12 having a diameter of 5⅛″ and an overall thickness of 3/16″ at the mounting area, a steel spindle 10 having a ¼″ diameter shaft portion 14, a ⅜″ square by 5/16″ long shank portion 13, and a ¾″ diameter head portion 15 with ⅛″ long lug portions 16, and a steel washer 11 of 1″ diameter by 3/64″ thick have been successfully employed to mount the wheel upon cold deformation of an approximately 1/16″ long outer end portion of shank portion 13.

It has also been found that the staking operation locates wheel 12 accurately enough to hold close runout tolerances and minimize possible loosening action created by rotation, vibration and flexing action of the wheel. Likewise, low assembly and manufacturing costs are obtained because of the single staking or cold forming operation, wherein one positive blow by the staking die further embeds the driving lug or prong portions into the wheel, stakes or cold forms the shank portion, locking the holding washer in place, and locates the driving spindle at right angles to the radial axis of the wheel. Breakdown and strength analysis tests have also indicated that the inventive mounting is acutally stronger than the wheel itself.

It will now be apparent how the invention accomplishes its various objects, and the numerous advantages inherent in the invention also will be evident. While the invention has been described and illustrated herein with reference to preferred embodiments, it is to be understood that various changes and modifications may be made in the invention by those skilled in the art without departing from the inventive concept, the scope of which is to be determined by the following claims.

I claim:

1. A rotatable spindle for a surface treating wheel and having a direction of rotation, said spindle comprising a deformable shank portion of polygonal cross section, a reduced shaft portion at one end of said shank portion, and an enlarged, disc-shaped head portion at the other end of said shank portion, said head portion having one side facing said shank portion and a plurality of equally spaced, peripheral lug portions projecting axially from its one side, said lug portions being struck out from said head portion and bent away from the direction of rotation of said spindle.

2. In an assembly including a surface treating wheel having a central through opening of non-circular cross section, the combination therewith of a mounting including a driving spindle and a washer operatively associated therewith, said spindle comprising a deformed shank portion of said non-circular cross section fitting through said opening and expanded at one end to form enlarged means, a reduced shaft portion at said one end, and an enlarged, disc-shaped head portion at the other end of said shank portion, said head portion having one side facing said shank portion and engaging one side of said wheel, and lug means projecting from its one side and embedded in said one side of said wheel, said washer comprising an enlarged, disc-shaped body having one side facing said one side of said head portion and engaging the other side of said wheel, and a central through opening of said non-circular cross section, said washer fitting over said shank portion and being locked in place thereon by said enlarged means.

3. The structure of claim 2 wherein said body is provided with recess means in its one side, and said recess means is aligned with and provides clearance for said lug means.

4. In an assembly including a surface treating wheel having a central through opening of polygonal cross section, the combination therewith of a mounting including a driving spindle and a washer operatively associated therewith, said spindle comprising a deformed shank portion of said polygonal cross section fitting through said opening and expanded at one end to form an enlarged flange portion, a reduced shaft portion at said one end, and an enlarged, disc-shaped head portion at the other end of said shank portion, said head portion having one side facing said shank portion and engaging one side of said wheel, and a plurality of lug portions projecting from its one side and embedded in said one side of said wheel, said washer comprising an enlarged disc-shaped body facing said one side of said head portion end engaging the other side of said wheel, and a central through recess of said polygonal cross section, said washer fitting over said shank portion and being locked in place thereon by said flange portion engaging its other side.

5. The structure of claim 4 wherein said body is provided with endless recess means in its one side, and said recess means is aligned with and provides clearance for said embedded lug portions.

6. In assembly including a surface treating wheel having a central through opening of polygonal cross section, the combination therewith of a mounting including a driving spindle and a washer operatively associated therewith, said spindle comprising a deformed shank portion of said polygonal cross section fitting through said opening and expanded at one end to form enlarged, outwardly flaring wedge portions, a reduced shaft portion at said one end, and an enlarged, disc-shaped head portion at the other end of said shank portion, said head portion having one side facing said shank portion and engaging one side of said wheel, and a plurality of lug portions projecting from its one side and embedded in said one side of said wheel, said washer comprising an enlarged disc-shaped body having one side facing said one side of said head portion and engaging the other side of said wheel, and an inner periphery formed by a central through opening of said polygonal cross section, said washer fitting over said shank portion and being locked in place thereon by said wedge portions engaging its inner periphery.

7. The structure of claim 6 wherein said body is provided with endless recess means in its one side, and said recess means is aligned with and provides clearance for said lug portions.

8. In an assembly including a surface treating wheel having a central through opening of polygonal cross section, the combination therewith of a mounting including a driving spindle and a washer operatively associated therewith, said spindle having a direction of rotation and comprising a deformed shank portion of said polygonal cross section fitting through said opening and expanded at one end to form enlarged, outwardly flaring wedge portions terminating in an enlarged flange portion, a reduced shaft portion at said one end, and an enlarged, disc-shaped head portion at the other end of said shank portion, said head portion having one side facing said shank portion and engaging one side of said wheel and a plurality of equally spaced, peripheral lug portions projecting axially from its one side and embedded in said one side of said wheel, said washer comprising an enlarged disc-shaped body having one side facing said one side of said head portion and engaging the other side of said wheel, and a central through opening of said polygonal cross section, said washer fitting over said shank portion and being locked in place thereon by said wedge portions engaging its inner periphery and by said flange portion engaging its other side.

9. The structure of claim 8 wherein said lug portions are struck out from said head portion and bent away from the direction of rotation of said spindle and wheel for maintaining their embedded position in said wheel, and wherein said washer body is provided with an endless recess in its one side between its inner and outer peripheries, and said recess is aligned with and provides clearance for said lug portions.

10. In a method of assembling a surface treating wheel having a central through opening and a mounting including a driving spindle and a washer operatively associated therewith, said spindle comprising a deformable shank portion, a reduced shaft portion at one end of said shank portion and an enlarged disc-shaped head portion at the other end of said shank portion, said head portion having one side facing said shank portion and lug means projecting from its one side, said washer comprising an enlarged disc-shaped body having one side facing said one side of said head portion and a central through opening, the steps comprising inserting said shaft and shank portions through said opening in said wheel, embedded said lug means in one side of said wheel, positioning said washer over said shank portion with said one side of said body facing the other side of said wheel, and expanding said shank portion at said one end by a staking operation to form enlarged means locking said washer in place on said shank portion.

11. In a method of assembling a surface treating wheel having a central through opening of polygonal cross section and a mounting including a driving spindle and a washer operatively associated therewith, said spindle comprising a deformable shank portion of said polygonal cross section, a reduced shaft portion at one end of said shank portion and an enlarged disc-shaped head portion at the other end of said shank portion, said head portion having one side facing said shank portion and a plurality of equally spaced, peripheral lug portions projecting axially from its one side, said washer comprisng an enlarged disc-shaped body having one side, a central through opening of said polygonal cross section and an endless recess in its one side between its opening and its outer periphery, the steps comprising in sequence, inserting said shaft and shank portions through said opening in said wheel, embedding said lug portions in one side of said wheel until said one side of said head portion engages said one side of said wheel, positioning said washer over said shank portion until said one side of said body engages the other side of said wheel with said recess being aligned with said lug portions and the other side of said body being spaced inwardly from said one end of said shank portion, and expanding said shank portion at said one end by a staking operation to form enlarged outwardly flaring wedge portions terminating in an enlarged flange portion, said washer being locked in place on said shank portion by said wedge portions engaging its inner periphery and by said flange portion engaging its other side, and said recess providing clearance for said lug portions.

References Cited
UNITED STATES PATENTS

| | | | |
|---|---|---|---|
| 834,273 | 10/1906 | Denney | 85—37 |
| 918,305 | 4/1909 | Farnell et al. | 85—37 |
| 922,049 | 5/1909 | Sanfason | 51—168 |
| 1,162,970 | 12/1915 | Binford | 51—168 X |
| 1,716,144 | 6/1929 | Morrison | 29—509 |
| 2,196,144 | 4/1940 | Eckler | 85—37 |
| 2,248,382 | 7/1941 | Phillips | 51—168 |
| 2,409,163 | 10/1946 | Stever | 51—379 |
| 2,557,609 | 6/1951 | McFadden | 85—37 X |
| 3,046,709 | 7/1962 | Cook | 51—358 X |
| 3,210,892 | 10/1965 | Perham | 51—168 |

LESTER M. SWINGLE, *Primary Examiner.*

UNITED STATES PATENT OFFICE
CERTIFICATE OF CORRECTION

Patent No. 3,362,114                     January 9, 1968

Robert H. Hurst

It is hereby certified that error appears in the above numbered patent requiring correction and that the said Letters Patent should read as corrected below.

In the grant, line 23, for "sixty-eigth" read -- sixty-eight --; column 1, line 64, for "illustarting" read -- illustrating --; column 2, line 14, for "especailly" read -- especially --; column 3, line 65, for "essentailly" read -- essentially --; column 4, line 32, for "acutally" read -- actually --; column 5, line 17, for "end" read -- and --; line 26, for "In" read -- In an --; column 6, lines 20 and 21, for "embedded said lug" read -- embedding said lug --.

Signed and sealed this 15th day of April 1969.

(SEAL)
Attest:

Edward M. Fletcher, Jr.
Attesting Officer

EDWARD J. BRENNER
Commissioner of Patents